United States Patent
Lambertini (10) Patent No.: US 8,602,710 B2
(45) Date of Patent: Dec. 10, 2013

(54) SILAGE BAG UNLOADING APPARATUS

(75) Inventor: Ramon Egar Lambertini, Provincia de Cordoba (AR)

(73) Assignee: Carlos Mainero y Cia. S.A.I.C.F.I., Bell Ville (AR)

( * ) Notice: Subject to any disclaimer, the term of this patent is extended or adjusted under 35 U.S.C. 154(b) by 400 days.

(21) Appl. No.: 12/872,999

(22) Filed: Aug. 31, 2010

(65) Prior Publication Data
US 2011/0052352 A1    Mar. 3, 2011

(51) Int. Cl.
*B65G 35/00*    (2006.01)

(52) U.S. Cl.
USPC .......................................................... 414/412

(58) Field of Classification Search
USPC ................. 414/304, 306–312, 403, 412, 523;
406/57; 241/101.72; 242/177; 198/320;
254/305, 351
See application file for complete search history.

(56) References Cited

U.S. PATENT DOCUMENTS

| | | | | |
|---|---|---|---|---|
| 3,632,967 A | * | 1/1972 | Saltzer et al. | 219/214 |
| 4,359,207 A | * | 11/1982 | Maryonovich et al. | 254/272 |
| 4,420,119 A | * | 12/1983 | Johnson | 241/101.71 |
| 7,802,956 B2 | * | 9/2010 | Schertz et al. | 414/403 |
| 7,861,851 B2 | * | 1/2011 | Dekoning | 198/513 |
| 7,997,849 B2 | * | 8/2011 | Twiestmeyer et al. | 414/412 |
| 8,167,526 B2 | * | 5/2012 | Schertz et al. | 414/403 |
| 8,251,630 B2 | * | 8/2012 | Hilsabeck et al. | 414/412 |
| 2009/0041566 A1 | * | 2/2009 | Lambertini | 414/526 |

* cited by examiner

*Primary Examiner* — Joshua Rudawitz
(74) *Attorney, Agent, or Firm* — Knobbe, Martens, Olson & Bear LLP (57) ABSTRACT

An apparatus for unloading bulk material form a silage bag, the apparatus collecting and lifting the grain while moving in a direction against the bag and cutting the bag in an upper part thereof, the apparatus dividing the bag in two side strips that are rolled up in rotary side spools, wherein once the strips are rolled up in the spools the spools are removed from the apparatus to collect the bag strips.

14 Claims, 5 Drawing Sheets

SILAGE BAG UNLOADING APPARATUS

BACKGROUND OF THE INVENTION

1. Field of the Invention

The present invention is related to the field of the machinery that is used in agricultural tasks such as bulk material collection, and more particularly the invention is related to the devices used for the collection and unloading of bulk material, such as grains, seeds, agricultural feed that has been previously stored in silage bags.

2. Description of the Prior Art

To better understand the object and scope of the present invention it is convenient to describe the current state of the art in reference to the devices and machines that are used for the collection of bulk material stored in silage bags.

Currently, the use of big and long silage bags with a great capacity for the storage of bulk materials, such as seeds, grains, agricultural feed and similar materials, generally of organic origin, that need protection from atmospheric conditions and insect or animal attacks that compromise their conservation and/or want to feed of the material that is contained in said bags, is widely and commonly known.

In that sense, generally in the field of agricultural exploitation, the produce of the harvest season is often stored in large, resistant bags made from adequate material, that are gradually stuffed with the bulk material that needs to be stored using adequate machinery known as bag stuffers. This task allows for long rows of bags to be arranged that contain the material, waiting to be extracted when it is needed, for usage as well as for transportation.

Therefore, at the moment of gathering the bulk material, such as for example grains for food produce or another type of bulk material such as seeds or agricultural feed among other possibilities, the great volumes, size and lengths that are part of this job and the distribution of the bag on the ground render imperative the availability of adequate machinery for the collection of said grains, seeds, agricultural feed and the like, as it is not possible to open a gate valve already installed in situ as in metallic and concrete silos, that are preferably elevated installations.

Currently there is a variety of machineries designed for the extraction of bulk material that is contained in silage bags for storage, many of which make a gash at the top and continue to open the bag gradually while endless sweepers work on the inside of the bag to extract its contents by means of an grain auger elevation tube. While the sweepers and the grain auger advance and empty the bag, the cut bag material can remain on the ground or get rolled up by a sole big horizontal and transversal roller or spool. When the bag is empty, it is entirely rolled up on this roller and must be unrolled from it, which is a task that implies labor and a lot of time.

Developments of this kind can be observed in the documentation of patents AR031252 and AR042763 that represent the traditional collection of the bag, as described before. Different types of extractors have grain collectors that use worm gears known in the art with different adjustment options such as those described in the patent documents AR036525, AR031384, and in the patent documents AR036704 wherein the bag is even illustrated as it is trampled under the wheels of the tractor.

Nonetheless, in agreement with everything that is revealed in these patents, once the material in the bag has been completely collected, the handling of the bag becomes difficult, knowing that the residue and bulk material is rolled up with the bag, hereby increasing the total weight. Actually, during the rolling up of the complete canvas that makes up the bag on this horizontal collection shaft, humid and rotting grains are also dragged along as well as dirt from the terrain, both on the inside and outside of the bag. Keeping in mind that a typical bag used for this type of job weighs approximately 100 kilograms and has a length of 60 to 75 meters, it is important to consider the ease of handling after having collected grain in its interior.

Additionally to what has been mentioned before, it is worth noting that generally, the machinery that currently has bag rollers, it is difficult for the user to remove the spool once the grain collection job is finished.

Furthermore, those current devices that contain collectors must be configured in two ways, one for bag collection and one for the transportation of the device as it is being towed, as a result of the great length of the bag roller and its horizontal arrangement.

For that reason it would be convenient to have an apparatus to unload bulk material such as grains, that allows for easy bag handling once they are rolled up, in order to facilitate bag removal from the extractor and minimize the weight that needs to be handled on each spool.

SUMMARY OF THE INVENTION

It is an object of the present invention to provide an apparatus to unload bulk material from silage bags wherein the apparatus moves forward against the bag that is to be unloaded while the bag is cut and rolled up into small spools to form small rolls that can be easily manipulated and discarded.

It is therefore an object of the present invention to provide an apparatus to unload bulk material, such as grains, seeds and agricultural feed, among others, that operates to roll up the bag to form more than one roll having a size easy to be manually handled as compared to a roll of the entire bag, thus allowing for said rolls, formed by the strips cut from the bag, to be handled and discarded.

It is therefore an object of the present invention, to provide an apparatus to unload grains from silage bags that operates by cutting the bag into side strips that are rolled up into spools to form small rolls having a size smaller than a roll that would be formed by the entire bag, wherein the apparatus has a cutter to divide the bag into two strips.

It is a further object of the present invention, to provide an apparatus to unload bulk material, the apparatus operates by cutting the bag, sweeping the contents of the bag, lifting and unloading the contents of the bag into a container, and then rolling up the strips that are cut from the bag into two spools and is capable of entirely emptying the bag up to the end thereof before rolling it up onto the corresponding spools.

It is therefore an object of the present invention to provide an apparatus or machine to unload grains from silage bags wherein it forms rolls of strips, cut from the bag which may be easily removed from the spools by means of a mechanism that releases the roll in a single operation.

It is yet another object of the present invention to provide an apparatus or machine to unload grains from silage bags wherein the apparatus operates to cut the bag into strips and form rolls of strips which are inclined, causing the grains and debris to fall down the strips thus reducing the size of the formed rolls, so that the apparatus can be used with the same configuration both for transportation and for operation.

It is also an object of the present invention to provide an apparatus or machine to unload grains from silage bags, wherein a front axial sweeping auger is mounted in a manner that can be folded in front of the chassis of the apparatus in order to be folded upwardly, into a vertical position, in order to allow the bag to be emptied completely.

It is another object of the present invention to provide a silage bag unloading apparatus, of the type having a movable chassis including at least a bag-cutting device and a sweeping auger mechanism designed to enter the silage bag to sweep the grain and bring the same towards an inlet of a lifting tube for unloading the grain, the sweeping auger mechanism comprising at least an axial auger and two side augers, wherein can be found at least two spools to roll up the bag, wherein each spool has a rotary rolling shaft that can be coupled to a rotary motor element, and wherein said at least two spools are arranged at both sides of the chassis of the apparatus and each one of said shafts is removably mounted between a couple of support plates at the ends.

The above and other objects, features and advantages of this invention will be better understood when considered in connection with the accompanying drawings and description.

BRIEF DESCRIPTION OF THE DRAWINGS

The present invention is illustrated by way of example in the following drawings wherein.

DESCRIPTION OF THE PREFERRED EMBODIMENTS

In order to describe and illustrate the present invention with the objective of facilitating its understanding and revealing the characteristics and advantages that can be derived from it, the above briefly described figures are added, which will illustrate a way of putting into practice the newfangled and inventive concepts that will be unveiled. Therefore, it is understood that in order to achieve clarity in what is being described and illustrated, for a technician with knowledge in the matter, what has been illustrated and described below is a preferred manner of bringing the invention into practice, thus recognizing that there are equivalent embodiments that fall within the scope of what has been revealed and protected here, as a technician in the matter will be able to deduce, taking into account the benefits that are divulged here.

Figure 1:
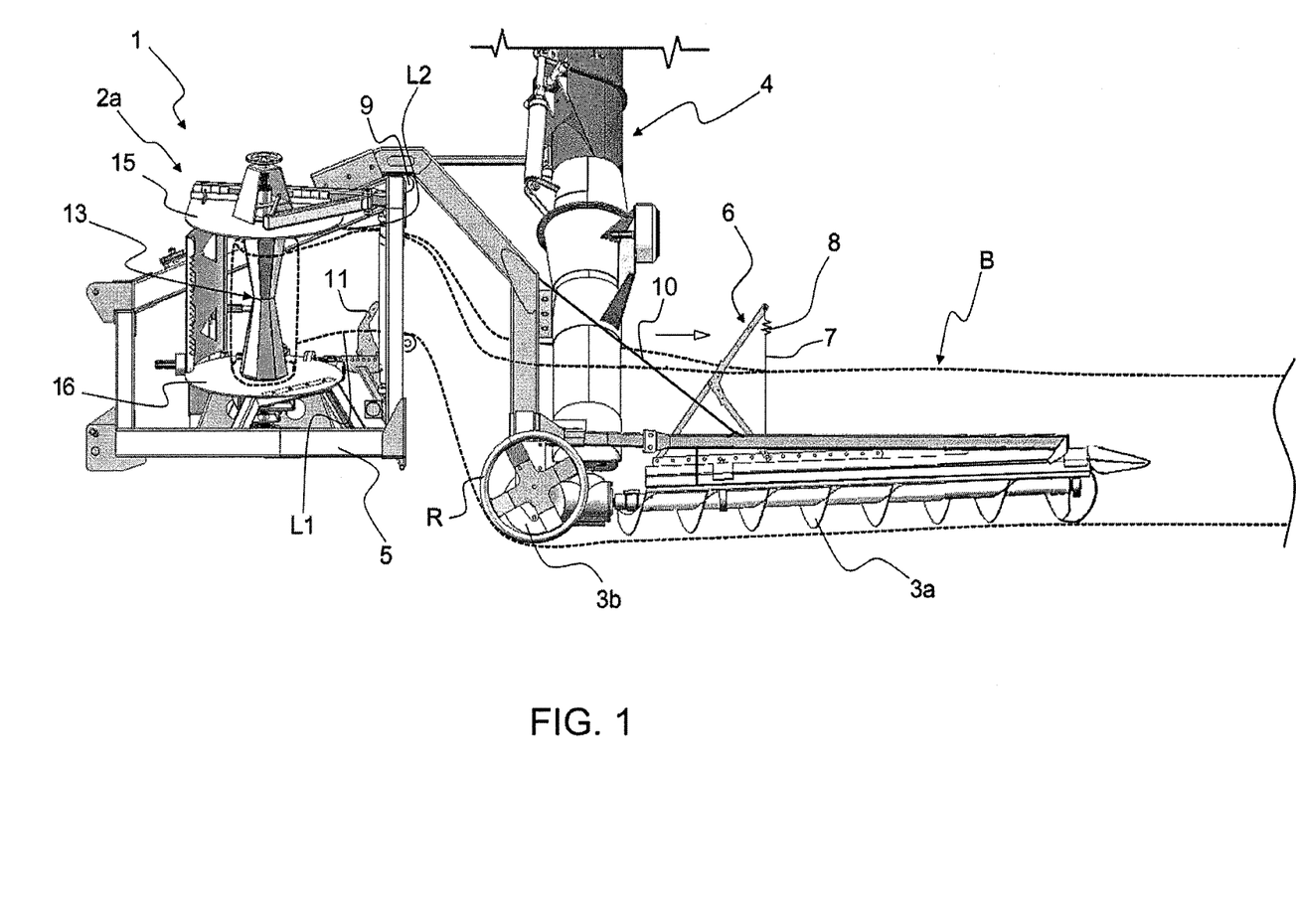
FIG. 1 is a lateral view of the extractor of the present invention, whereby a phantom line indicates the position of the bag and the path is travels once it is processed by the extractor.
Figure 2:
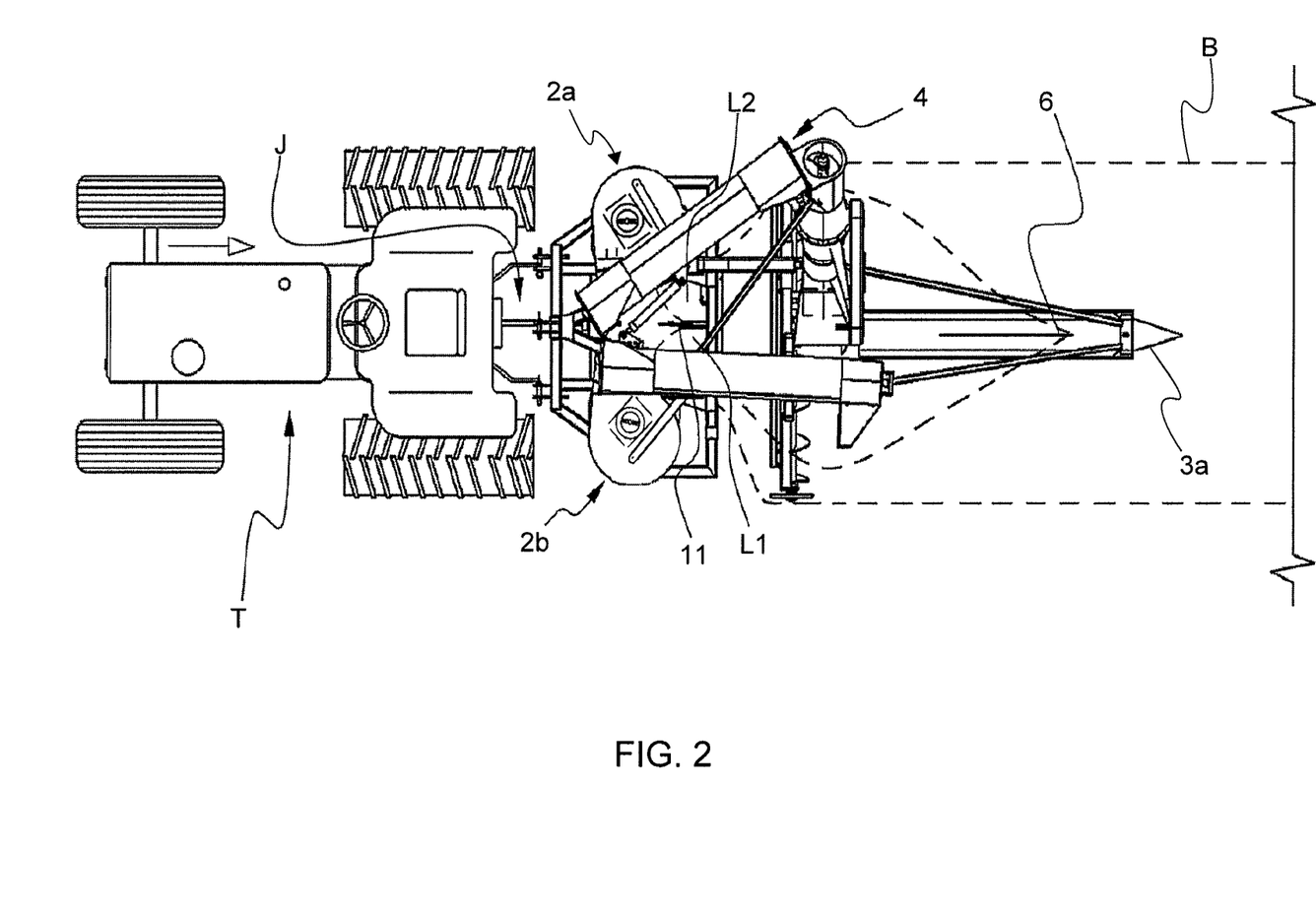
FIG. 2 is an upper view of the extractor in agreement with the present invention, wherein said extractor can be observed as it is connected to a tractor, the grain elevation tube being in undeployed position and whereby a phantom line is used to indicate the position of the bag as it is picked up and rolled up, as a result of which the convenience of the arrangement of more than one spool becomes apparent, which implies a minimum width, suitable to be transported over paths and roads compliant with governmental regulations.

In reference to FIGS. 1 and 2, the bulk silage bag material extractor is illustrated in agreement with the concepts of the present invention and indicated with the general reference 1, wherein a bag "B" is observed that is extended over the entire terrain, full of bulk material (not illustrated) and that is being emptied by the extractor that is the subject of the invention. For this purpose, the bag is being cut, pulled and rolled up by a couple of spools 2a and 2b of which one can be seen in FIG. 1, the second spool 2b being hidden from the view, merely for reasons of clarity of the drawing.

The machine 1 contains a sweeping auger mechanism 3a, 3b and 3c, designed to enter the silage bag to sweep the grain and bring it towards the inlet of an elevation tube 4 and unload the bulk material, the sweeping auger mechanism comprising at least an axial auger 3a and two side augers 3b and 3c. These augers can be protected by wheels or rings "R" to avoid direct contact with the bag. Tube 4, generally a closed tube with an internal auger, has a lower inlet and from there it grabs, elevates and ejects the collected material through the upper extremity of the auger, usually with the objective of loading it into a hopper or loading container that will accompany the path of the extractor 1.

Generally, in this type of machinery, the different components are assembled onto a chassis 5 or a more or less complex metallic structure in agreement with the need and/or design criteria adopted by its structure. The machine can therefore operate autonomously, i.e. have its own drive engine and/or can be connected to the power take-off of a tractor "T", or receive power through a hydraulic circuit.

In accordance with what has been illustrated in said FIGS. 1 and 2, it is observed that the grain extractor of the current invention moves in the direction of the hollow-point arrows, i.e. towards the right of said figures, while it cuts bag 1, using a cutting element such as a cutting knife known in the art as upper cutting knife. This determines the opening of the bag as an unfolded canvas, therefore allowing the passage of the rest of the components of the extractor, such as the elevation tube 4 in the advance direction. In agreement with one aspect of the invention, the bag cutting device comprises a front cutter, made up by said cutting element 6 and a rear cutter, which will be referenced further ahead. Preferably, at least the front cutter 6 comprises a cutting wire 7, elastically assembled, for example by means of a spring 8, and is connected to an electrical circuit (not illustrated), for example an energy source, that is capable of heating up the wire so it can cut the bag using the temperature of the wire 7. This provides the advantage that the hot wire cuts in any direction while conventional cutting knives are not efficient when the machine is out of line with the longitudinal direction of the bag opening.

As someone who is well-versed in the art will appreciate, although the use of sweeping augers and elevation tubes is well-known in the art, as has been explained before, the arrangement and posterior manipulation or elevation and transportation of the bag once it has been collected in agreement with the currently available devices on the market, entails the previously mentioned difficulties, generally as a result of their great weight and size. In accordance with the invention, and as will be described below, the new extraction machine uses a special configuration that has been developed for the collection of bag B as well as a more efficient way of cutting the bag and having the possibility of folding the front axial auger 3a to allow for the bag B to be emptied completely.

Figure 3:
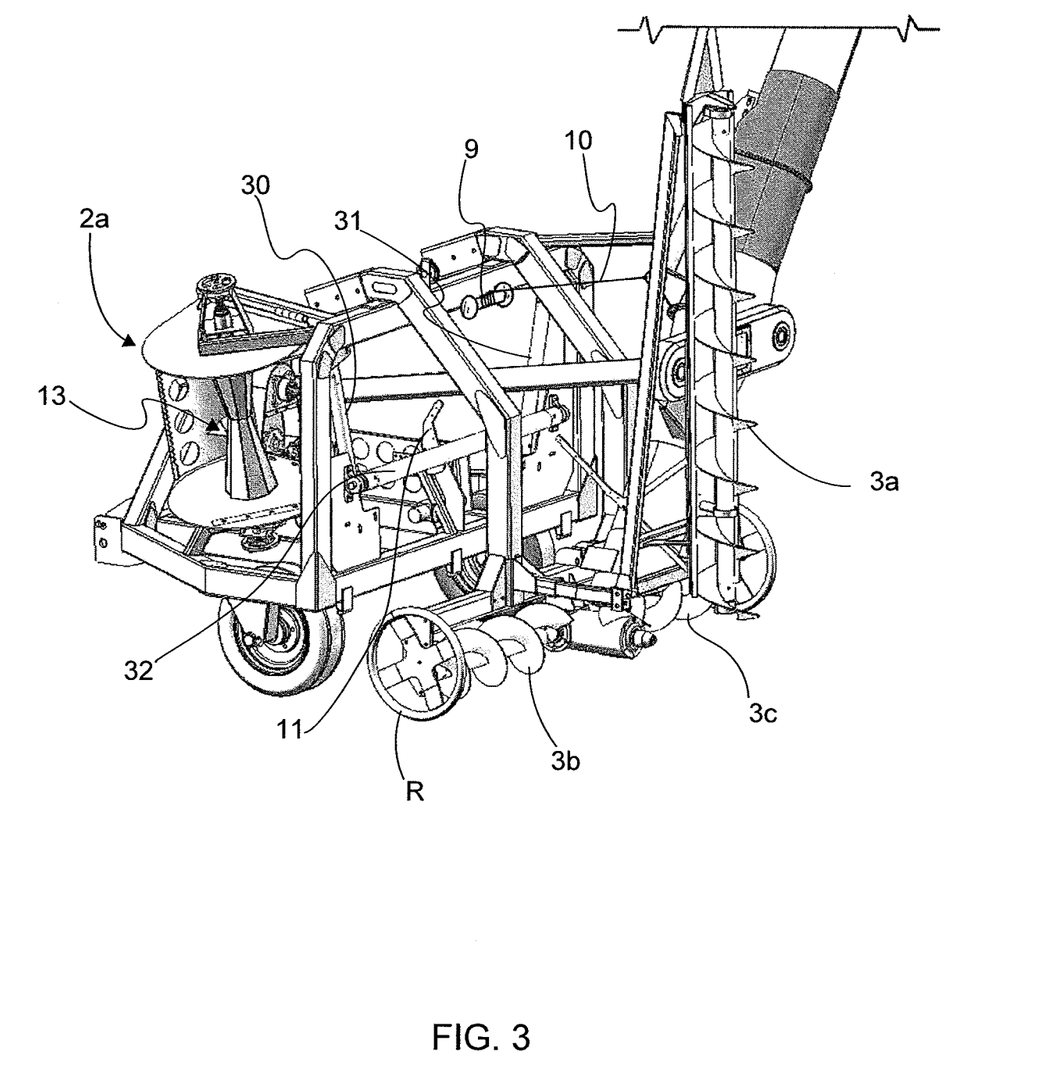
FIG. 3 is a perspective view wherein the arrangement of both spools, the guide rolls and other components that interact with the silage bag can be appreciated.

While spools 2a and 2b rotate and wind up the bag, as is described below in reference to this important aspect of the invention, the sweepers 3a, 3b and 3c gradually deliver the grain to the elevation tube 4. When the end of the bag is reached, i.e. the end that remains closed, the machine of the invention has another improvement compared to the machines of the prior art and it consists in the possibility of folding the axial sweeping auger 3a upwardly, to adopt the position that is shown in FIG. 3, so the lower intake of the elevation tube 4 reaches the end of the bag allowing all of the grain in the bag to be extracted. This task, in conventional machines, cannot be performed like this and it is necessary for the operators to empty the end of the bag using shovels.

In order to elevate the sweeping auger 3a, the chassis 5 has a motor or wench 9 where a rope or wire 10 is reeled that is connected to any convenient part of the axial auger 3a. As will be explained below, once the end of the bag is reached, the spools 2a and 2b will have reeled the bag following two lateral slices, as cut by the cutting devices of the machine. The new configuration, mechanisms and reeling concept on the newfangled spools that are revealed here, represent a substantial improvement as to the results and expediency obtained in comparison with the prior art.

As can be seen in FIGS. 1 and 3, the arrangement of more than one spool is observed, i.e. a reeling spool 2a and a second reeling spool 2b, one on each side of the chassis 5. These bag reeling spools 2a and 2b allow for the bag 1 to be divided in two slices L1 and L2, better illustrated in FIG. 1, thanks to a lower cut made in the bag 1, using a second bag cutter 11, as can be a V-shaped knife or other embodiment that is equivalent with regards to performance but that is preferably shaped, as is the case of the front cutter 6, using a thermal wire that is elastically mounted. Said cutter 11 is placed behind the sweeping augers 3a, 3b and 3c, allowing for the bag B to remain in a single canvas, i.e. keeping its flooring intact during the collection of the grain by the augers, but in such a way that its lower section is conveniently divided or cut once the collection has finished so lateral slices are formed that will be reeled onto the spools 2a and 2b, thus forming two rolls that are more easily manipulated that the ones that are formed in one big horizontal roll, as is the case in the prior art. The division of the bag in at least two slices L1 and L2, allows for the weight and volume of the bag reels to be reduced after the bag has been emptied. This greatly facilitates the storage and collection of the bag for recycling.

In agreement with the invention, slices L1 and L2 of the bag B are reeled onto respective spools 2a and 2b, each of which comprises a reeling shaft 13 that is coupled to a rotation motor element 14, such as an electric or hydraulic motor, that can drive the shaft 13 through for example a drive chain 17 and can be arranged on any convenient part of the extractor. Each one of said shafts 13 is removably mounted between a couple of end support plates, i.e. an upper mounting plate 15 and a bottom mounting plate 16. The bottom plate 16 can be attached to the chassis 5 but the upper plate 15 is fixed in such a way that it can be moved from its position and is preferably collapsible to the chassis 5 for example by means of hinged connections 18 so it can be collapsed and elevated as is shown by arrow F in FIGS. 4 and 5.

Preferably, the spools, and therefore their rotating shafts 13, are arranged at each side of the extractor and substantially vertical, nonetheless the geometrical rotation shaft of each spool is generally oblique; it is worth noting that it has an inclination angle in respect of the horizontal but it could also form a 90 degree angle with the ground (verticality of the axis).

Each spool 2a and 2b will be made up of the combination of a rotation shaft 13 and the end plates 15 and 16 that function as ledges or lateral stoppers of the spool. Said plates 15 and 16 can adopt different forms according to simple design decisions, to better accompany the reeling of the slices that are obtained from the bag B. One of the main advantages of the present invention lies in that fact that, once the slices of the bag B are reeled onto the shaft 13 of the corresponding spools 2a and 2b, the reeled bag will form a package or roll of a size that has can be easily handled and can be pulled out or removed from the spool or reeling axis quickly and easily as is described below.

Actually, the stretches or slices of bag are rolled around the respective shafts 13 which can be removed, with the reeled bag, from their respective plates 15 and 16, which is very beneficial. In other words, shaft 13, once it has contributed to tractioning and reeling the slice L1 or L2 of bag B, is removed to allow so the bag reel is separately available.

Figure 4:
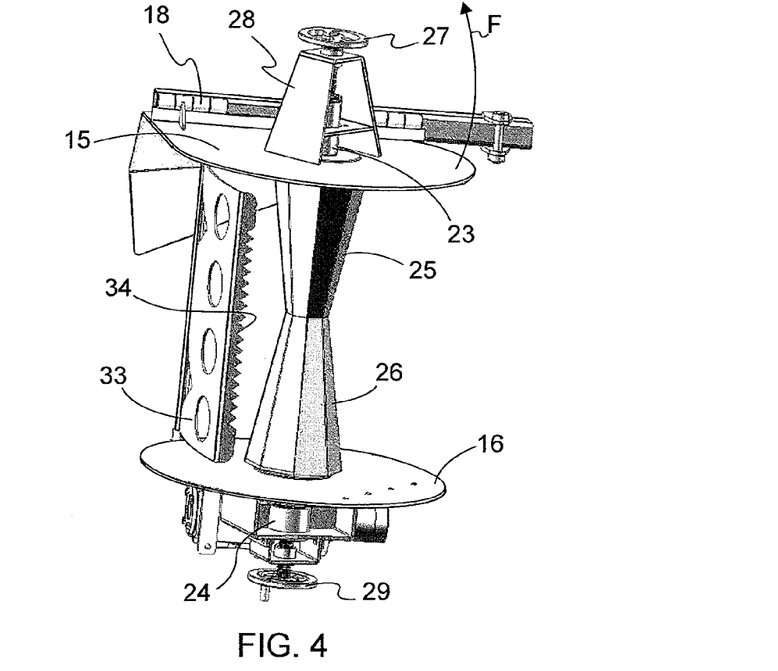
FIG. 4 is a perspective view of one of the extractor's spools in agreement with the preferred embodiment of the invention.
Figure 5:
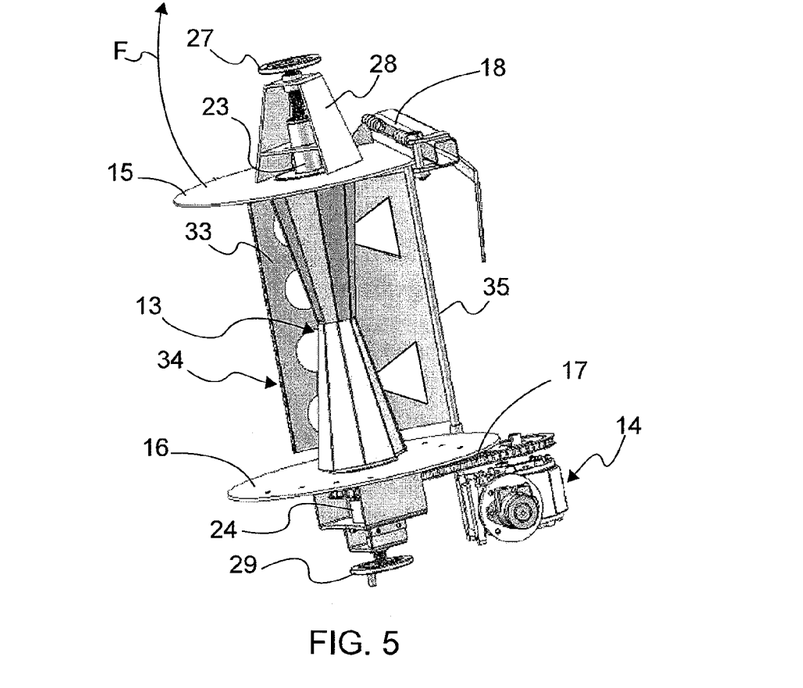
FIG. 5 is a perspective view of the spool in FIG. 4, taken from a different angle.
Figure 7:
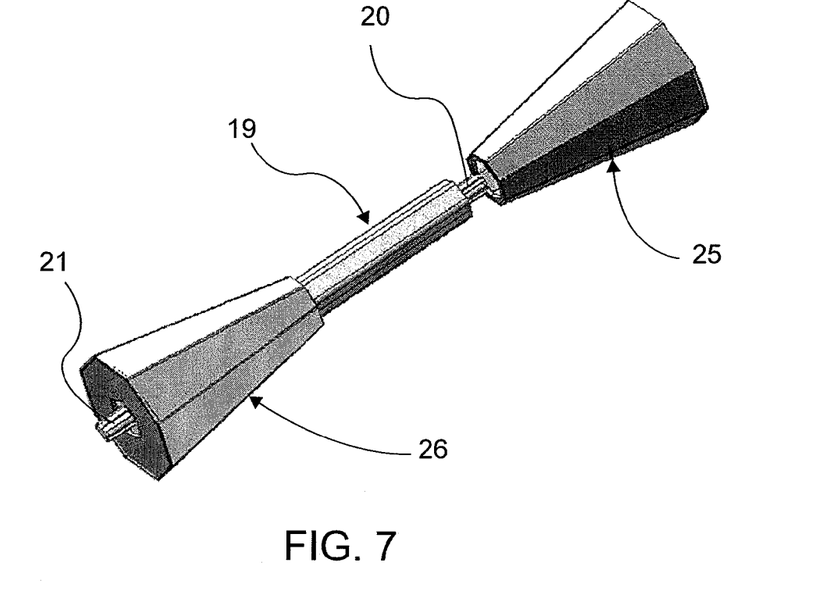
FIG. 7 is a perspective and exploded view of the winding reel shaft of FIG. 6.

Continuing with the detailed description and with the objective of clarifying the way in which the same shaft 13 can alternatively rotationally traction the bag to reel in one of the slices and afterwards release it so the finished reel is separately available, one of the spools 2a or 2b has been shown in FIGS. 4 and 7, describing and illustrating only one for the purpose of clarity and understanding that they are both identical.

Each one of said rotating shafts 13 comprises a core shaft 19, preferably made up of a square, faceted, hexagonal, etc. pipe that has two grooved coupling ends 20 and 21, and at least one of said grooved ends is coupled to said motor element or motor 14 by means of any adequate rotation mechanism. This way, the ends 20 and 21 are coupled to axle-boxes or bearings or end coupling parts 23 and 24.

Figure 6:
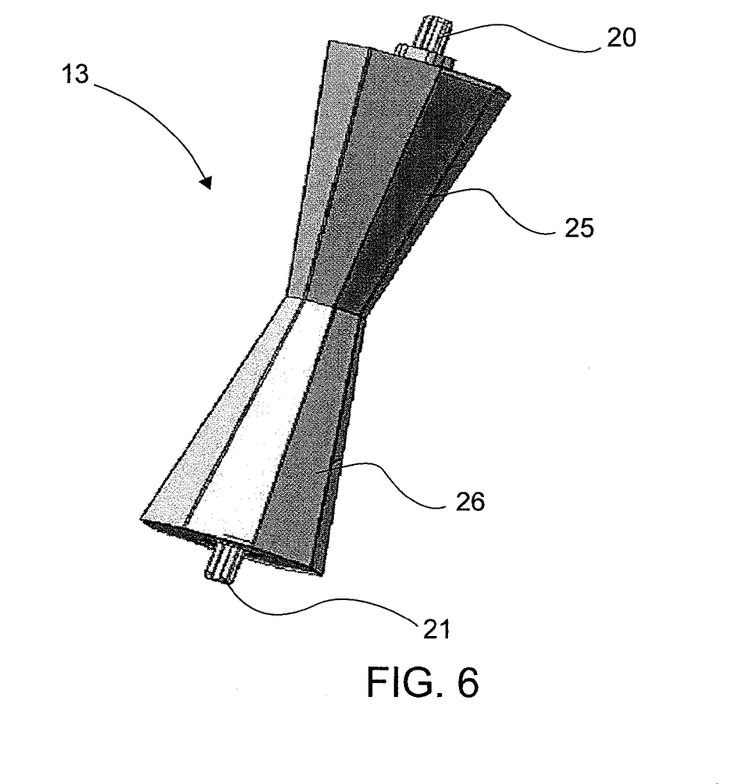
FIG. 6 is a perspective view of a winding reel shaft, also called rolling up shaft, with its cones placed thereon and the winding reel shaft removed from the spool o FIGS. 4 and 5.

The core shaft is encased within a couple of axially inverted cones, mounted onto said core shaft 19 with the apices of the cones facing each other on the middle section of said core shaft. Cone 26 of said cones is preferably fixed to the core shaft 19 while the other cone 25 can slide down shaft 19 to be removed, but both cones form a coupling to rotate together with said core shaft when they are mounted on the shaft. This can be done using the square section of the shaft or pipe 19 and one complementary internal section of the orifice that the cones contain for pipe 19 to be inserted. As can be better observed in FIG. 6, the grooved ends 20 and 21 of pipe 19 project over the bases of the cones 25 and 26 to fit through the orifices (not illustrated) that are provided in the corresponding drive or bearing element.

The upper plate 15 has a manual rotation handle 27, fixed to the adequate support plate 28, on which it can freely rotate. When the plate 15 acquires the position that is illustrated in the figures, the handle 27 is screwed on in a way to keep the coupling between the grooved end of pipe 19 and the bearing or axle-box or mounting part 23 so the shaft assembly 13 can rotate. In the same way, the bottom plate 16 has a handle 29 that is adjusted in order to guarantee the firm position of the lower grooved end 20 of the pipe 19 to maintain the coupling in drive relation with the chain 17 and by means of the bearing part, axle-box or coupling 24. Consequently, the rotation shaft 13 can rotate between the plates 15 and 16, driven by motor 14.

When the grain extraction from the bag B is started, the top part of the bag is cut, the lower part of the bag is passed behind the sweeping augers 3b and 3c. From that point onwards, the lower part of the bag is cut and the cut is aligned with the cutting element 11, creating two lateral bag slices L1 and L2. Next, each slice is conducted onto the inclined guide rollers 30 and 31, and the horizontal guide roller 32, and the end of the respective slice is wrapped around the corresponding shaft 13. Rollers 30, 31 and 32 help to lift and guide the path of the bag B while it is being elevated and divided into separate slices. Shaft 13 can be provided with teeth or locking elements to retain the end of the slice. When the machine is started and the shafts 13 begin to rotate, the bag slices are reeled onto the spools 2a and 2b and the machine advances as a result of the traction on the slices, towards the right, as can be seen in the figures. The reeling of the bag will actually provide enough traction power on the bag B so the extractor advances towards said bag without the need for an exterior traction vehicle to push the extractor.

Once the bag has been emptied, the spools 2a and 2b will have the bag slices reeled onto the respective shaft 13. In order to remove these rolls, the upper handle 27 of each spool 2a and 2b is loosened and once the coupling part 23 has been disengaged from the end of the shaft or pipe 19, the plate 15 can be lifted by pivoting it, as indicated by the arrow F, around its hinged connection 18. Once plate 15 has been lifted, the shaft assembly 13 can be removed with the bag slice roll attached by pulling it upwards in order to disconnect the lower extremity of the pipe 19 from the coupling part 24.

It is possible that the reeled bag conserves a lot of tension around the shaft 13, which may complicate its removal from the shaft. For this purpose, before lifting the plate 15, an unrolling arm 33 can be rotated, in the form of a plate or sheet with a serrated edge or end 34 while on its other end or edge it is hinged onto 35. That way, the serrated edge 34 is rested onto the bag roll that sits on shaft 13 and the rotation of motor 14 is inverted in order to make the bag roll loosen up and be released from shaft 13. Once this is done, shaft 13 can be extracted, as has been explained before, pulling the shaft and roll upwards to remove everything together from the bottom plate 16. If it is still difficult to remove the roll and shaft that is gripping the bottom plate 16, the disengaging handle 29 is provided which can be rotated to push pipe 19 upwards and make it disengage from its firm contact with plate 16. After doing this, the extraction is facilitated even further.

Once shaft 13 is removed together with the bag roll around it, the base of the cone 25 is pulled outwards and practically the bag roll is totally released from the opposing cone and pipe 19, while a small, compact and easily manipulated bag roll remains. The shafts 13 are reassembled onto the respective plates and the machine is ready for the next operation.

It is worth noting that the size of the obtained roll is notably less than it would be if the entire bag would be reeled onto a single roll as is done using the machines in the prior art.

It is once more repeated that, although the mechanism has been described referring to the spool 2b, all the descriptions provided also correspond to the spool 2a and other spools that may be incorporated into the extractor in agreement with what has been revealed here.

Among the advantages that the present invention offers, it should be noted that by elevating the bag B before it is cut for the second time, there is an improvement of the cleaning of the grains that may still remain stuck to the bag material; the almost vertical or oblique positioning of the slices "L" of the bag B contributes to the rests and grains of the bulk material that was contained by the bag B falling or even providing a new sweeping of the slices before they are finally reeled.

An additional contribution of the reeling onto spools in agreement with the present invention, is the advantage of not having to configure two different positions for the extractor as regards to dimension and position of the rolls. It is no longer needed to have a working position and a transportation position, it is worth noting that the work of altering the shaft positions and other elements for the collection work and posterior transportation of the equipment over roads, is avoided. The extractor equipment of the invention works in the same direction as it is transported when unengaged.

Whatever the perimeter developed by the bag B, it can be divided into two slices, thereby shortening the length of the roll that is obtained by at least half. This first division associated with the almost vertical reeling, or vertical if it were necessary, makes the width of the extractor independent from said perimeter developed by the bag B, a situation that is currently conditioned by the use of a single horizontal roll that is difficult to remove.

As can be seen in FIG. 2, which illustrates a top view of the extractor, a tractor "T" can tow the extractor to transport it over roads to different work places and also, during the work cycle said tractor does not need to be disconnected from the extractor as it will be pulled by the reeling action of the bag B divided into different slices in the direction that is indicated by the hollow-point arrow.

The normal and convenient practice for the use of this type of extractor, generally coincides with the use of the tractor to provide the driving force to the different mechanisms, generally using a cardan joint or feed shaft "J", in such a way that the bag reeling pulls the tractor forward, whereby the tractor only delivers driving force through said cardan joint or feed shaft.

In said FIG. 2, although a three-point connection between the extractor and the tractor has been illustrated for illustrative reasons only, other types of equivalent connections known in the art can be used, as the configuration of the chassis and distribution of the other components that form part of the present invention do not at all prevent the use of this type of connection or other types of connections and/or different complements.

In FIG. 2 the arrangement of both spools 2a and 2b towards both sides of the extractor can also be observed. The location that the bag B will adopt to begin the collection work of the bulk material is complemented using a phantom line. Furthermore, the preferred arrangement is observed of the front cutter 6 and back cutter 11 that generate the cutting in bag B.

We claim:

1. A silage bag unloading apparatus comprising:
a movable chassis;
a bag cutting device configured to cut the silage bag into two slices, said bag cutting device comprising a front cutter and a back cutter, wherein the front cutter is configured to cut the silage bag before the back cutter cuts the silage bag, and the back cutter is placed vertically above the front cutter so that the silage bag after being cut by the front cutter is vertically or obliquely elevated when the silage bag is cut by the back cutter;
a lifting tube;
a sweeping auger mechanism comprising at least an axial auger and two side augers, said sweeping auger mechanism being configured to enter into the silage bag to sweep grains in the silage bag and bring the grains towards an inlet of the lifting tube for unloading the grains; and
at least two spools to roll up the silage bag, wherein each spool has a rotary rolling up shaft capable of being coupled to a rotary motor, and wherein said at least two spools are arranged one at each side of the chassis of the apparatus and each one of said shafts is removably mounted between a couple of end support plates so as to roll up each of the two slices of the silage bag.

2. The apparatus of claim 1, wherein said end support plates comprise a bottom plate and an upper plate, the upper plate being hinged in said chassis.

3. The apparatus of claim 1, wherein each one of said rotary rolling up shafts comprises a core shaft having two coupling ends at least one of which is coupled to said motor.

4. The apparatus of claim 3, wherein said motor is a motor connected to a transmission chain which in turn is connected in driving relationship to said core shaft.

5. The apparatus of claim 4, wherein said core shaft is encased within a couple of axial inverted cones mounted on said core shaft with the apexes of the cones being facing to each other at a mean section of said core shaft, said cones having a coupling to rotate together with said core shaft.

6. The apparatus of claim 5, wherein at least one of said cones is slidably removably mounted on said core shaft.

7. The apparatus of claim 3, wherein said ends of the shaft pass through orifices in said support plates to connect to said motor and to a roller.

8. The apparatus of claim 2, wherein said support plates include disengaging handles to disengage the plates from said rotary rolling up shaft.

9. The apparatus of claim 1, wherein each said bag rolling up spool defines a rotation axis forming an angle of inclination relative to the horizon.

10. The apparatus of claim 1, wherein an unrolling arm is arranged between said support plates the unrolling arm having end pivoting in said chassis and a gripping end to engage the bag rolled up in the rotary rolling up shaft.

11. The apparatus of claim 1, wherein said front cutter is positioned ahead of the lifting tube, and the back cutter is positioned behind the sweeping auger mechanism.

12. The apparatus of claim 11, wherein at least said leading cutter comprises a resiliently mounted thermal cutting wire.

13. The apparatus of claim 1, wherein said chassis includes a plurality of guide rolls to slidably guide strips cut from the bag.

14. The apparatus of claim 1, wherein said axial auger is pivotally mounted in a bottom end of the chassis and is connected to a pulling cable which in turn is connected to a lifting motor mounted in said chassis.

* * * * *